United States Patent [19]

Holthoff

[11] 4,414,859
[45] Nov. 15, 1983

[54] BEVEL GEAR DIFFERENTIAL DRIVES AND METHODS FOR ADJUSTING THEIR TOOTH ENGAGEMENT

[75] Inventor: Helmut Holthoff, Düsseldorf, Fed. Rep. of Germany

[73] Assignee: Kocks Technik GmbH & Company, Hilden, Fed. Rep. of Germany

[21] Appl. No.: 182,605

[22] Filed: Aug. 29, 1980

[30] Foreign Application Priority Data

Jan. 16, 1980 [DE] Fed. Rep. of Germany ....... 3001342

[51] Int. Cl.³ ............................................. F16H 1/14
[52] U.S. Cl. ...................................... 74/417; 74/398; 74/406; 74/409; 74/411
[58] Field of Search ................ 74/395, 396, 398, 406, 74/409, 410, 411, 417, 423, 799

[56] References Cited

U.S. PATENT DOCUMENTS

| Re. 17,266 | 4/1929 | Waseige | 74/799 |
|---|---|---|---|
| 587,713 | 8/1897 | Dutton | 74/410 |
| 1,619,552 | 3/1927 | Waseige | 74/799 |
| 1,725,774 | 8/1929 | Zeithammer | 74/799 |
| 2,355,144 | 8/1944 | Carlson | 74/799 |
| 3,563,104 | 2/1971 | Schuster | 74/395 |
| 4,266,436 | 5/1981 | Reppert | 74/395 |
| 4,294,218 | 10/1981 | King et al. | 74/395 |

FOREIGN PATENT DOCUMENTS 52-41765 3/1977 Japan ..................................... 74/799

Primary Examiner—Leslie A. Braun
Assistant Examiner—Joseph M. Rolnicki
Attorney, Agent, or Firm—Buell, Blenko, Ziesenheim & Beck

[57] ABSTRACT

A method and apparatus for adjusting tooth flank play between two sun gears and at least two planetary gears of a bevel gear differential drive is provided in which, after establishing the operating positions of both sun gears on their sun gear shaft, each planetary gear is shifted on its shaft, previously inserted into a transverse bore of the sun gear shaft, after which the planet gears are brought into their precise operating positions relative to the sun gears and perpendicular to the sun gear shaft and are stopped there with the maintenance of an equal tooth flank play to the sun gears, by first inserting the planetary shaft into the transverse bore of the sun gear shaft in an axially displaceable manner, then placing each planetary gear on its planetary gear shaft with a previously calculated axial distance from the sun gear shaft, and then adjusting an equal tooth flank play by axial displacement of the planetary gears with their planetary gear shafts in the transverse bore and finally fixing planetary gear shafts definitively in the transverse bore.

10 Claims, 6 Drawing Figures

BEVEL GEAR DIFFERENTIAL DRIVES AND METHODS FOR ADJUSTING THEIR TOOTH ENGAGEMENT

This invention relates to bevel gear differential drives and methods for adjusting their tooth engagement and particularly to bevel gear differential drives and means and methods for adjusting tooth flank play in such bevel gear differentials.

The present invention primarily concerns a method for setting the tooth flank play between two sun gears and at least two planetary gears of a bevel gear differential drive, in which after an establishment of the operating positions of both sun gears on their sun gear shaft each planetary gear is shifted on its planetary gear axis, which was previously inserted into a transverse bore of the sun gear shaft, after which the planetary gears are brought into their precise operating positions relative to the sun gears and prependicular to the sun gear shaft and stopped there while maintaining an equal tooth flank play with regard to the sun gears.

In the case of a conventional planetary gear axis for two planetary gears the two planetary gears can be assembled only after the planetary gear axis is inserted into the transverse bore because the diameter of the planetary gears is greater than the diameter of the transverse bore in the sun gear shaft. In any event, it is possible only to preassemble a planetary gear and then push the still-free end of the planetary gear axis through the transverse bore of the sun gear shaft before the second planetary gear is mounted. In the subsequent adjustment of the tooth flank play between the planetary gears and the sun gears an attempt is made to maintain it absolutely equal in size. This is the only means of assuring that all the planetary gears participate to an identical degree in the power transfer and one of the planetary gears is not damaged by overloading while the other or others remain essentially unloaded.

The previously mentioned uniform adjustment of the tooth flank play is quite cumbersome and time-consuming with the methods known and practiced to date. Since the magnitude of the tooth flank play is dependent on the axial position of the planetary gears with regard to the sun gears and since planetary gear axis, in the familiar constructions, assumes a definite established position with regard to the sun gears, a change in the tooth flank play takes place only through a change in the position of the planetary gears on their axes. Therefore, in the familiar method the planetary gears generally have to be assembled on their planetary gear axis repeatedly and again disassembled after measurement of the tooth flank play because it generally turns out that the tooth flank play is still not correct. By grinding off spacer sleeves or by replacing them with others, the position of the planetary gears on their planetary gear axes and thus the tooth flank play is modified in the familiar process. The planetary gear axis itself is not shifted in the familiar method. It is set and stopped prior to moving at least the second planetary gear into the transverse bore of the sun gear shaft.

This prior art conventional method has the significant disadvantage that the assembly is very time-consuming and cumbersome. It also requires considerable mechanical ability and appropriate experience because the measured deviation of the actual tooth flank play from the desired play cannot be equated with the degree by which the planetary gear in question must be displaced on the planetary gear axis and can only be accomplished by trial and error. The fitting of the spacer sleeves or rings is thus difficult and is possible in practice only after several attempts.

The invention confronts the task of providing a method for setting the tooth flank play in a bevel gear differential drive of the initially mentioned type and provide a method in which these shortcomings do not arise, but which facilitates a rapid, precise, and equal setting of the tooth flank play. Another purpose of the present invention is to provide an adjusting arrangement and a bevel gear differential drive with at least two planetary gears, with which the method according to the invention can be carried out.

The method according to the invention is characterized in that each planetary gear axis is inserted into the transverse bore of the sun gear shaft only in an axially displaceable manner at first, that then each planetary gear is stopped on its planetary gear axis with a previously calculated axial distance from the sun gear shaft, and that only then is an equal tooth flank play set by axial displacement of the planetary gears with their planetary gear axes in the transverse bore and then the planetary gear axes are definitely stopped in the transverse bore. Both the sun gears and planetary gears are thus definitively assembled in a previously calculated position on the sun gear shaft and/or on the planetary gear axis, which is immediately possible. The calculated positions then furnish a desired total tooth flank play, which only then should be uniformly distributed. This distribution of the tooth flank play takes place according to the invention by displacing the planetary gear axis or axes crosswise to the sun gear shaft, in which case the tooth flank play is then measured directly at the points of engagement and compared. In the case of deviations, disassembly is no longer required; rather, a displacement of the planetary gear axis involved is sufficient. If the tooth flank play is uniformly set, the planetary gear axes can be definitively locked and thus also the tooth flank play, which is then everywhere uniform. The repeated, cumbersome assembly and disassembly of planetary gears and the processing or replacement of spacer sleeves or rings advantageously is eliminated.

It is generally advisable to load the bevel gear differential drive continuously with a slight torque during adjustment of the tooth flank play. This does not need to be so great that the tooth flanks of one of the engaged planetary gears lie solidly against the tooth flanks of the sun gears. This should then also be the case in the other planetary gear or gears. If this is not so, then they require an axial displacement until they also lie tight against the sun gears and also transfer a portion of the torque. However, it is also possible that the adjustment of an equal tooth flank play in all the planetary gears can be carried out only by loading the bevel gear differential drive in the case of axially displaceable planetary gear axes. In the case of such a displaceability the planetary gears are automatically set to an equal flank play if they are loaded with a sufficiently high torque. Subsequently, the planetary gears and/or their shafts should be stopped.

An arrangement that has a shifting device, preferably pressing screws or set screws that engage on the front face of the planetary gear shaft, is also advisable. The displacement by a precise desired amount can then take place more exactly and more simply and not by jerks, as would occur, for example, in the case of hammer blows or unilateral pressing and which would result in an undesirably long displacement.

The object of the present invention is also a bevel gear differential drive for carrying out the method according to the invention. This drive is characterized in that each planetary gear shaft is installed in the transverse bore of the sun gear shaft directly or through an intermediated sleeve with a forced-feed lubrication seat that is familiar in itself. As long as the seat surfaces are loaded by the oil under pressure, the planetary gear shaft can move in the transverse bore of the sun gear shaft. If the compressing force of the oil is removed, a reliably fixed press fit of the planetary gear shaft develops in the transverse bore, whereby the setting of the tooth flank play then established can no longer be modified. In a preferred embodiment of the bevel gear differential drive according to the invention, the distribution grooves in the transverse bore, the planetary gear shaft, or the intermediate sleeve that are provided for the pressurized oil are located only on the peripheral section, on which the greater surface pressure arises when the drive is loaded with a torque.

The invention is illustrated in the drawings by means of several embodiments, where:

Figure 1:
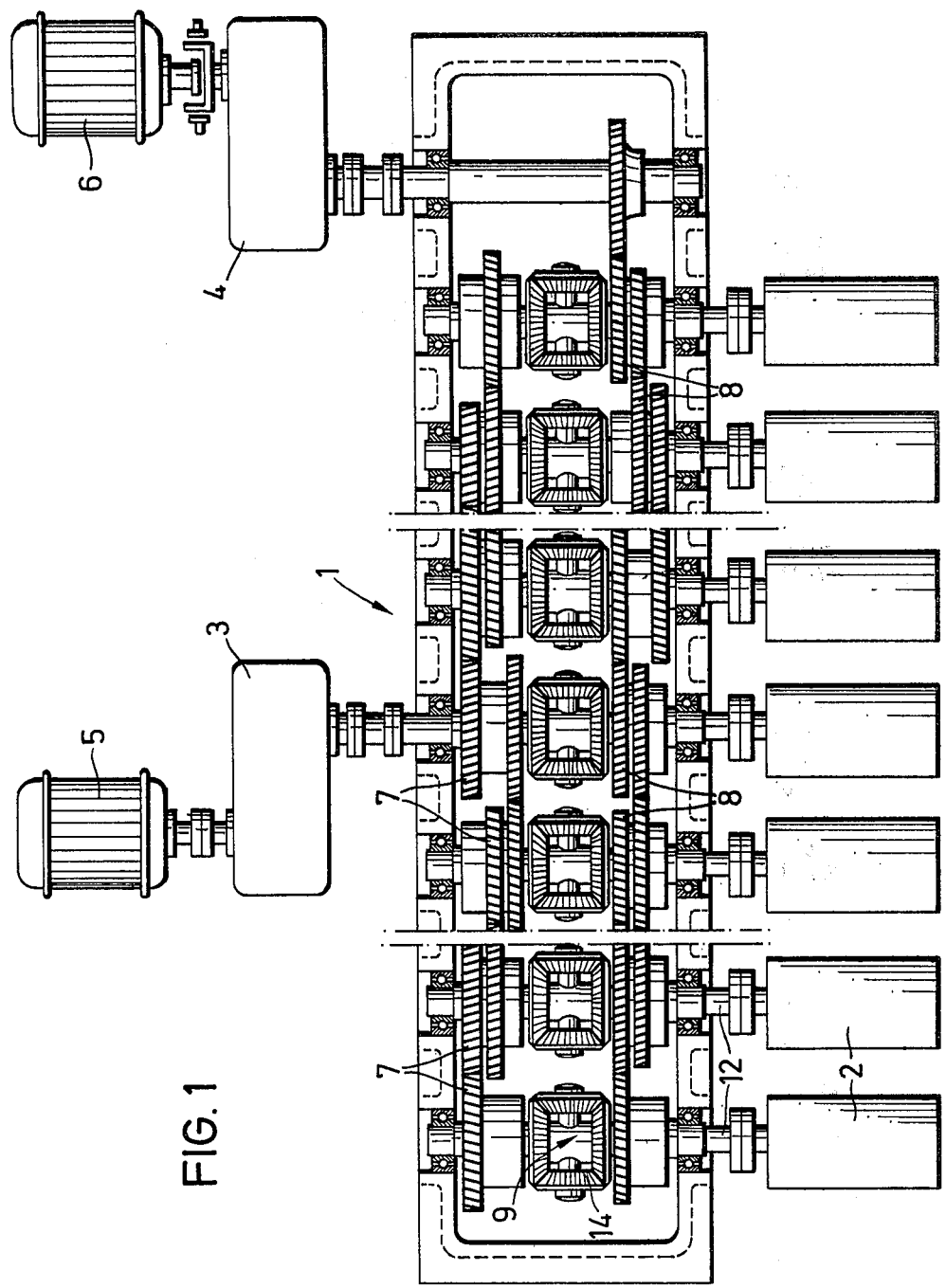
FIG. 1 shows a driving gear with bevel gear differential drives in plan view.

A differential drive according to the invention is designated by 1 in FIG. 1; it serves to drive roll stands 2 that constitute a stretch-reduction rolling mill for the production of tube. The rolls of the roll stands 2 (not shown) are driven through drive 1 and countershaft drives 3 and 4 by two motors 5 and 6. Two motors are provided in this driving gear for the purposed of regulating the r.p.m., in which case the principal motor 5 produces a basic r.p.m., which is transferred through the gear drive path designated by 7, possibly with intermediate reductions, to the individual drive shafts of the roll stands 2. The supplementary motor 6 can transfer an additional r.p.m., to the individual drive shafts of the roll stands 2 through a second gear drive path 8 in a similar manner. There are thus two different r.p.m.'s on each drive shaft, which are combined into one r.p.m., namely the actual drive r.p.m., by means of a bevel gear differential drive 9 at each stand.

Figure 2:
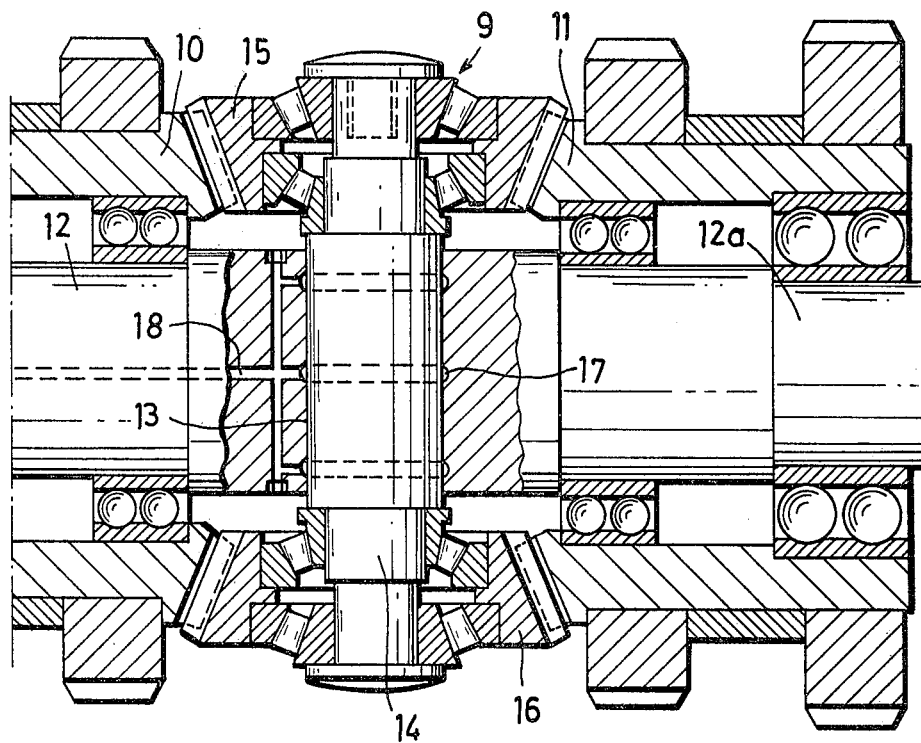
FIG. 2 shows a single bevel gear differential drive according to FIG. 1 in magnified scale in partial cross section.

Such a bevel gear differential drive 9 is more clearly illustrated in FIG. 2. It has two sun gears 10 and 11, through which the basic or supplementary r.p.m.'s are introduced. The sun gears 10 and 11 are supported in a rotatable manner on the sun gear shaft 12, which is at the same time the drive shaft for the roll stand 2. The sun gear shaft 12 has a transverse bore 13, into which a planetary gear shaft 14 is introduced. The planetary gear shaft 14 carries, rotatably supported on both end sections, the planetary gears 15 and 16, which at the same time engage with both sun gears 10 and 11. The tooth flank play of the two planetary gears 15 and 16 with regard to the sun gears 10 and 11 must be equal. In order to assure this and achieve it with simple means, the planetary gear shaft 14 is introduced in the transverse bore 13 of the sun gear shaft 12 with an oil-forced fit. Distribution grooves 17, which are loaded wih pressurized oil through a bore 18, assure an axial displacement of the planetary gear shaft 14 in the transverse bore 13 of the sun gear shaft 12, whereby the axially rotatable, but solidly positioned planetary gears 15 and 16 are both shifted, and thus an identical tooth flank play can be achieved in the two planetary gears 15 and 16, such that both planetary gears 15 and 16 are loaded identically.

In order to apply the torque during the adjustment of the tooth flank play, the sun gears 10 and 11 and possibly also the pertinent spur gears of the gear drive paths 7 and 8 are solidly held and the torque is introduced through the power take-off journal of the sun gear shaft 12 (designated by 12a). The engaged teeth of the sun gears 10 and 11 will thus engage with the teeth of at least one of the planetary gears 15 and 16. The remaining planetary gear 15 or 16 is then axially displaced until its engaged tooth flanks also lie against the countertooth flanks of the sun gears 10 and 11. The axial displacement of the planetary gears 15 and 16 takes place according to the invention through displacement of the correlated planteary gear shaft 14. This can be effected with a displacing device, but also by a sufficiently large torque with which the bevel gear differential drive 9 is loaded in the case of the displaceable planetary gear shaft 14. Force components that act in an axial direction and shift the planetary gears 15 and 16 together with their shaft 14, in the axial direction arise on the planetary gears 15 and 16 as a result of the torque. If the tooth flank play is identical in both planetary gears 15 and 16, the loading with pressurized oil can be eliminated, which leads to a fixed seating of the planetary gear shaft 14 in the transverse bore 13.

Figure 3:
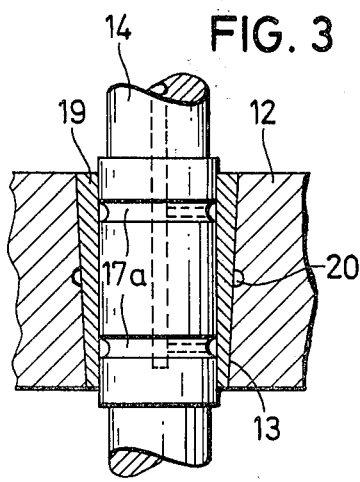
FIGS. 3-5 show fragmentary sections of various embodiments of the press fit of the planetary gear shaft in the sun gear shaft.

An intermediate sleeve 19 that is slid with a sliding fit on the planetary gear shaft 14 was used in the embodiment according to FIG. 3. The intermediate sleeve 19 has a conical outer surface, with which it is pressed together during assembly with the planetary gear shaft 14 in the transverse bore 13 of the sun gear shaft 12, using an oil press fit. The grooves designated by 20 serve to supply the pressurized oil. They are required only for assembly and are subsequently relieved. In order to adjust the tooth flank play and thus shift the planetary gear shaft 14, the distribution grooves 17a are loaded with pressurized oil. After adjustment and release of the pressurized oil, a fixed seating of the planetary gear shaft 14 in the sun gear shaft 12 results.

Figure 4:
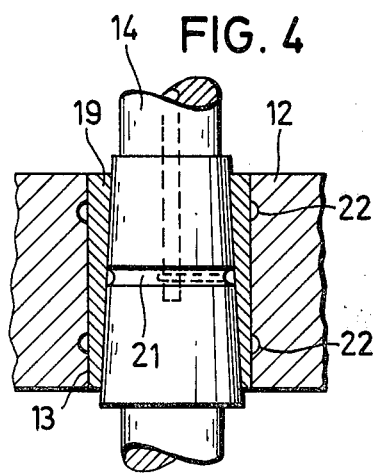

An embodiment that constitutes the counterpart of the embodiment according to FIG. 3 is shown in FIG. 4. In this case, the intermediate sleeve 19 has a conical development on its inner side, just as the outer surface of the planetary gear shaft 14. During assembly, the intermediate sleeve 19 with sliding fit is first inserted into the transverse bore 13 of the sun gear shaft 12 and only then is the planetary gear shaft 14 introduced into the intermediate sleeve 19, using an oil-press fit. The groove 21 serves here only to supply pressurized oil during assembly. In this embodiment the planetary gear shaft 14 is shifted together with the intermediate sleeve 19, in which case the distribution grooves 22 are loaded with pressurized oil.

Figure 5:
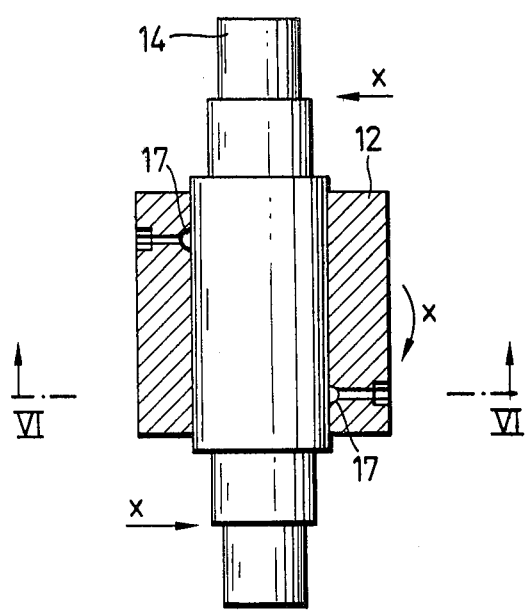
Figure 6:
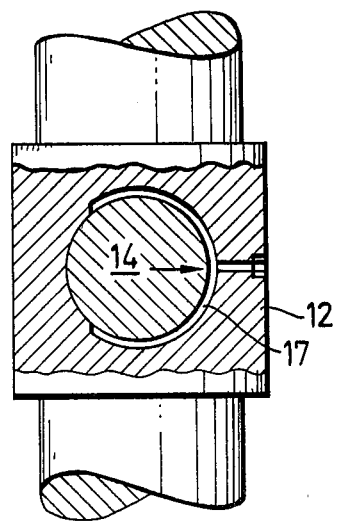
FIG. 6 shows a section along the line VI—VI of FIG. 5.

FIGS. 5 and 6 are merely to demonstrate that the distribution grooves 17 are located only on the peripheral section, on which the greater surface pressure occurs when the drive is loaded with a torque, represented by the arrow x.

In the embodiments shown, only one planetary gear shaft 14, which completely passes through the sun gear shaft 12, is provided. However, it is also conceivable that each planetary gear 15, 16, or so on has separate short planetary gear shafts 14, which support the planetary gear 15, 16 at one end section and with the other end section are inserted into a transverse bore 13, which does not completely pass through the sun gear shaft 12, but has only a limited depth.

In the foregoing specification I have set out certain preferred embodiments and practices of this invention, however, it will be understood that this invention may be otherwise practiced within the scope of the following claims.

I claim:

1. A bevel gear differential drive comprising a sun gear shaft having a transverse bore intermediate its ends, a pair of sun gears fixed against axial movement and rotatable on said sun gear shaft on opposite sides of said bore and functionally equally spaced therefrom, at least one planetary gear shaft in said transverse bore having an end extending from each side of said bore, a planetary gear fixed on each said end extending from the bore and means on said sun gear shaft for shifting the planetary gear shaft in the bore along with the planetary gears until flank play between the planetary gears and sun gears is substantially equal, and means frictionally fixing the planetary gear shaft as a press fit against a further movement in the transverse bore of the sun gear shaft.

2. A bevel gear differential drive comprising a sun gear shaft having a transverse bore intermediate its ends, a pair of sun gears fixed against axial movement and rotatable on said sun gear shaft on opposite sides of said bore and functionally equally spaced therefrom, at least one planetary gear shaft in said transverse bore having an end extending from each side of said bore, a planetary gear fixed on each said end extending from the bore and means on said sun gear shaft for shifting the planetary gear shaft in the bore along with the planetary gears until flank play between the planetary gears and sun gears is substantially equal and wherein the transverse bore and planetary shaft have a force feed lubricator assembly.

3. A bevel gear assembly as claimed in claim 2 wherein the force feed lubricating assembly includes oil distributions grooves for pressure oil between the bore and planetary shaft.

4. A bevel gear assembly as claimed in claim 2 or 3 wherein the plantary gear shaft is inserted through the transverse bore and provided with planetary gears on each end.

5. A bevel gear assembly as claimed in claim 2 or 3 wherein the planetary gear shaft is carried in an intermediate sleeve inserted in the transverse bore, said sleeve and planetary shaft each being surrounded by a force feed lubrication assembly.

6. A bevel gear assembly as claimed in claim 2 or 3 having an oil distribution grooves provided in one of the transverse bore, the plantary gear shaft and an intermediate sleeve between the planetary gear shaft and transverse bore adjacent peripheral section of each on which greater surface pressure arises during torque loading of the gear drive assembly.

7. A method for adjusting tooth flank play between two sun gears and at least two planetary gears of a bevel gear differential drive comprising the steps of:
   (a) fixing said two sun gears against axial movement and in operating position for rotation on a sun gear shaft on opposite sides of a transverse bore through said shaft;
   (b) inserting a planetary gear shaft in said transverse bore in the sun gear shaft in axial displaceable manner;
   (c) fixing each planetary gear on the end of said planetary gear shaft at a previously calculated distance from the sun gear shaft;
   (d) adjusting tooth flank play by shifting said planetary gears and planetary gear shaft axial in the transverse bore as a unit until equal tooth flank play is achieved and
   (e) frictionally fixing the planetary gear shaft as a press fit against further movement in the transverse bore of the sun gear shaft.

8. Method according to claim 7, characterized in that the bevel gear differential drive is continuously loaded with a slight torque during the adjustment of the tooth flank play.

9. A method for adjusting tooth flank play between two sun gears and at least two planetary gears of a bevel gear differential drive comprising the steps of:
   (a) fixing said two sun gears against axial movement and in operating position for rotation on a sun gear shaft on opposite sides of a transverse bore through said shaft;
   (b) inserting a planetary gear shaft in said transverse bore in the sun gear shaft in axial displaceable manner;
   (c) fixing each planetary gear on the end of said planetary gear shaft at a previously calculated distance from the sun gear shaft;
   (d) adjusting tooth flank play by shifting said planetary gears and planetary gear shaft axial in the transverse bore as a unit until equal tooth flank play is achieved; and
   (e) fixing the planetary gear shaft against further movement in the transverse bore of the sun gear shaft;

said adjustment of tooth flank play being carried out by force feed lubricating the area between the transverse bore and planetary gear shaft and moving said planetary gear shaft axial during said force feed lubricating.

10. Method according to claim 9, wherein the bevel gear differential drive is continuously loaded with a slight torque during the adjustment of the tooth flank play.

* * * * *

UNITED STATES PATENT AND TRADEMARK OFFICE
CERTIFICATE OF CORRECTION

PATENT NO. : 4,414,859

DATED : November 15, 1983

INVENTOR(S) : Helmut Holthoff

It is certified that error appears in the above-identified patent and that said Letters Patent is hereby corrected as shown below:

Column 2, line 24, "definitely" should be --definitively--.

Claim 4, column 5, line 50, "plantary" should be --planetary--.

Claim 6, column 6, line 1, "plantary" should be --planetary--.

Signed and Sealed this

Fourteenth Day of February 1984

[SEAL]

Attest:

GERALD J. MOSSINGHOFF

Attesting Officer

Commissioner of Patents and Trademarks